United States Patent
Liu et al.

(10) Patent No.: US 12,301,726 B2
(45) Date of Patent: May 13, 2025

(54) METHOD FOR PROCESSING APPLICATION PROGRAM AND RELATED PRODUCT

(71) Applicant: Petal Cloud Technology Co., Ltd., Dongguan (CN)

(72) Inventors: Deqian Liu, Shenzhen (CN); Rubo Xu, Shenzhen (CN)

(73) Assignee: PETAL CLOUD TECHNOLOGY CO., LTD., Dongguan (CN)

( * ) Notice: Subject to any disclaimer, the term of this patent is extended or adjusted under 35 U.S.C. 154(b) by 339 days.

(21) Appl. No.: 17/764,777

(22) PCT Filed: Sep. 27, 2020

(86) PCT No.: PCT/CN2020/118165
§ 371 (c)(1),
(2) Date: Mar. 29, 2022

(87) PCT Pub. No.: WO2021/057982
PCT Pub. Date: Apr. 1, 2021

(65) Prior Publication Data
US 2022/0335107 A1    Oct. 20, 2022

(30) Foreign Application Priority Data

Sep. 29, 2019  (CN) .......................... 201910935759.1

(51) Int. Cl.
*H04L 9/32*    (2006.01)
*G06F 21/10*   (2013.01)

(52) U.S. Cl.
CPC ............ *H04L 9/3247* (2013.01); *G06F 21/10* (2013.01); *H04L 2209/603* (2013.01)

(58) Field of Classification Search
None
See application file for complete search history.

(56) References Cited

U.S. PATENT DOCUMENTS

| | | | |
|---|---|---|---|
| 8,972,726 B1* | 3/2015 | Poling | H04L 63/0428 713/168 |
| 10,380,568 B1* | 8/2019 | Rogers | G06Q 20/1235 |
| 2002/0049679 A1* | 4/2002 | Russell | H04L 63/0428 705/52 |

(Continued)

FOREIGN PATENT DOCUMENTS

| CN | 101729550 A | 6/2010 |
|---|---|---|
| CN | 101833623 A | 9/2010 |

(Continued)

*Primary Examiner* — Scott B Christensen
(74) *Attorney, Agent, or Firm* — Conley Rose, P.C.

(57) ABSTRACT

A method for processing an application program includes steps for a non-service system to obtain a first running instruction from a user for running a target first service system. Sending, by a terminal, a key acquiring request to a digital rights management (DRM) server using the non-service system, requesting key information corresponding to the target first service system. The key information is fed back by the DRM server when the user has use permission of the target first service system. Decrypting, by the terminal, the target first service system based on the key information using the non-service system, and executing a service function corresponding to the target first service system.

20 Claims, 10 Drawing Sheets

(56) References Cited

U.S. PATENT DOCUMENTS

| | | | |
|---|---|---|---|
| 2014/0047557 A1* | 2/2014 | Veerubhotla | H04L 63/102 |
| | | | 726/28 |
| 2014/0047558 A1 | 2/2014 | Veerubhotla et al. | |
| 2018/0089400 A1 | 3/2018 | Barnes et al. | |
| 2018/0357391 A1 | 12/2018 | Dekker | |

FOREIGN PATENT DOCUMENTS

| | | |
|---|---|---|
| CN | 101872404 A | 10/2010 |
| CN | 102087605 A | 6/2011 |
| CN | 106230777 A | 12/2016 |
| CN | 106603230 A | 4/2017 |
| CN | 107646110 A | 1/2018 |
| CN | 109728912 A | 5/2019 |
| CN | 110752929 A | 2/2020 |
| EP | 2357585 A2 | 8/2011 |
| EP | 4030680 A1 | 9/2020 |

* cited by examiner

METHOD FOR PROCESSING APPLICATION PROGRAM AND RELATED PRODUCT

CROSS-REFERENCE TO RELATED APPLICATIONS

This is a U.S. National Stage of International Patent Application No. PCT/CN2020/118165 filed on Sep. 27, 2020, which claims priority to Chinese Patent Application No. 201910935759.1 filed on Sep. 29, 2019. Both of the aforementioned applications are hereby incorporated by reference in their entireties.

TECHNICAL FIELD

This application relates to the field of application program technologies, and in particular, to a method for processing an application program and a related product.

BACKGROUND

With continuous development of electronic technologies and computer technologies, terminals such as mobile phones, tablets, and intelligent wearable devices have been popularized. A terminal may help users implement various functions by using various application programs. More and more attention is paid to copyright protection of application programs.

Currently, copyright protection of an application program mainly protects use permission of the application program A specific protection manner is: the application program includes a digital rights management (digital rights management, DRM) module and a service module, where the DRM module is configured to manage use permission of the service module; and the service module is configured to implement a service function of the application program. For example, a service module of a picture processing application program is configured to implement a picture processing function. When a terminal starts an application program in response to an operation of a user, a DRM module of the application program first requests a DRM signature from a DRM server. After obtaining the DRM signature, the DRM module of the application program checks whether the DRM signature is valid. If the DRM signature is valid, the DRM module returns, to a service module of the application program, an authentication result indicating a DRM authentication success. After receiving the authentication result indicating the authentication success, the service module implements a service function of the application program. However, if the protection manner is used, an unauthorized user can run the service module of the application program at will only by modifying an authentication result returned by the DRM module into the authentication result indicating the authentication success, so as to implement the service function of the application program. As a result, there is a relatively large bug in a protection manner for use permission of a service function of an application program.

SUMMARY

This application provides a method for processing an application program and a related product, so as to effectively protect use permission of a service module of an application program.

According to a first aspect, this application provides a method for processing an application program, where the application program includes one or more encrypted first service modules and an unencrypted non-service module. The method includes: first, w % ben the non-service module obtains a first running instruction triggered by a user for running a target first service module, sending, by a terminal, a key acquiring request to a digital rights management (Digital Rights Management, DRM) server by using the non-service module, where the key acquiring request is used to request key information corresponding to the target first service module, and the key information is fed back by the DRM server when it is determined that the user has use permission of the target first service module; obtaining, by the terminal by using the non-service module, the key information sent by the DRM server; and decrypting, by the terminal, the target first service module based on the key information by using the non-service module, and executing a service function corresponding to the target first service module.

In the technical solution of this application, because the first service module that needs to be protected is encrypted, the terminal needs to obtain corresponding key information when running the first service module to implement a corresponding service function. A condition for obtaining the key information is that a user using the terminal needs to have use permission of the first service module. In this way, only a user who has the use permission of the first service module can use a service function of the first service module of the application program, thereby effectively protecting the use permission of the service function of the application program.

In some possible implementations, the key acquiring request includes user information of the user and module information of the target first service module, so that the DRM server searches for application program permission information of the user based on the user information; and determining, based on the application program permission information and the module information, whether the user has the use permission of the target first service module. In this way, the DRM server may find, based on the user information, the application program permission information corresponding to the user, so that the DRM server can manage and control, based on application program permission information of each user in a permission library, use permission of a service module of an application program used by each user.

In some possible implementations, the key acquiring request further includes verification information that is provided by the user and that corresponds to the user information; and the verification information is used by the DRM server to determine, before the searching step, that the user information matches the verification information. In this way, the DRM server may verify whether the first running instruction is triggered by the user corresponding to the user information, so as to prevent an unauthorized user from obtaining user information of a first user who has the use permission of the target first service module, and obtain the key information of the target first service module from the DRM server based on user information of the first user.

In some possible implementations, before the sending, by a terminal, a key acquiring request to a DRM server by using the non-service module, the method further includes: determining, by the terminal by using the non-service module, that the terminal does not have the key information corresponding to the target first service module. In this case, when the terminal has the key information corresponding to the target first service module, the non-service module does not need to send the key acquiring request to the DRM server, but may decrypt the target first service module by using the key information in the terminal. In this way, the terminal can run the target first service module more quickly.

In some possible implementations, the application program further includes an unencrypted second service module; and the method further includes: when the non-service module obtains a second running instruction triggered by a user for running the second service module, executing, by the terminal by using the non-service module, a service function corresponding to the second service module, where the one or more first service modules are configured to implement some service functions of the application program, and the second service module is configured to implement some other service functions of the application program. In this way, only use permission of some service functions of the application program can be managed and controlled, so that a permission management manner of the application program is more flexible.

In some possible implementations, the non-service module includes a control module and a DRM module. The sending, by a terminal, a key acquiring request to a DRM server by using the non-service module specifically includes: sending, by the terminal, an authentication request to the DRM module by using the control module; and sending, the key acquiring request to the DRM server according to the authentication request by using the DRM module. The receiving, by the terminal by using the non-service module, the key information sent by the DRM server specifically includes: receiving, by the terminal by using the DRM module, the key information sent by the DRM server. The decrypting, by the terminal, the target first service module based on the key information by using the non-service module, and executing a service function corresponding to the target first service module includes: decrypting, by the terminal, the target first service module based on the key information by using the DRM module; sending an authentication response indicating an authentication success to the control module when decryption succeeds; and when the control module receives the authentication response indicating the authentication success, the service function corresponding to the target first service module by using the control module. In this way, because the first service module that needs to be protected is encrypted, even if an unauthorized user enables, by modifying application code, the DRM module to send the authentication result indicating the authentication success to the control module, the first service module cannot be decrypted as long as the DRM module has not obtained the key information of the first service module. Therefore, only a user with permission can use the service function corresponding to the first service module, which effectively protects the use permission of the service function of the application program.

In some possible implementations, the sending, by the terminal, an authentication request to the DRM module by using the control module includes: displaying, by the terminal, a preset image, and sending the authentication request to the DRM module by using the control module. The executing, by the terminal when the control module receives the authentication response indicating the authentication success, the service function corresponding to the target first service module by using the control module specifically includes: when the control module receives the authentication response indicating the authentication success, stopping, by the terminal, displaying the preset image, and executing the service function corresponding to the target first service module by using the control module. In this way, the terminal displays the preset image in a process in which the DRM module sends the key acquiring request for requesting the DRM server to deliver the key information, so that the following phenomenon can be avoided: The terminal cannot immediately run the target first service module because the key information needs to be obtained, and the user mistakenly considers that the application program is stalled.

According to a second aspect, this application provides a terminal, including a display screen, a memory, one or more processors, and a plurality of application programs. The memory stores one or more programs. When the one or more processors run the one or more programs, the terminal is enabled to perform the method for processing an application program in any possible implementation of the first aspect.

According to a third aspect, an embodiment of this application provides a computer storage medium, including a computer instruction. When the computer instruction runs on a terminal, the terminal is enabled to perform the method for processing an application program in any possible implementation of the first aspect.

According to a fourth aspect, an embodiment of this application provides a computer program product. When the computer program product runs on a terminal, the terminal is enabled to perform the method for processing an application program in any possible implementation of the first aspect.

BRIEF DESCRIPTION OF DRAWINGS

To describe the technical solutions in the embodiments of this application or the prior art more clearly, the following briefly describes the accompanying drawings for describing the embodiments.

DESCRIPTION OF EMBODIMENTS

The following clearly describes the technical solutions in the embodiments of this application in detail with reference to the accompanying drawings. In descriptions of the embodiments of this application, unless otherwise stated, "/"

indicates "or". For example, A/B may indicate A or B. The term "and/or" in this specification merely describes an association relationship for describing associated objects, and indicates that three relationships may exist. For example, A and/or B may indicate the following three cases: Only A exists, both A and B exist, and only B exists. In addition, in the descriptions of the embodiments of this application, "a plurality of" means two or more.

The terms "first" and "second" mentioned below are merely intended for description, and shall not be understood as an indication or implication of relative importance or implicit indication of a quantity of indicated technical features. Therefore, a feature limited by "first" or "second" may explicitly or implicitly include one or more features. In the descriptions of the embodiments of this application, unless otherwise specified, "a plurality of" means two or more.

Figure 1:
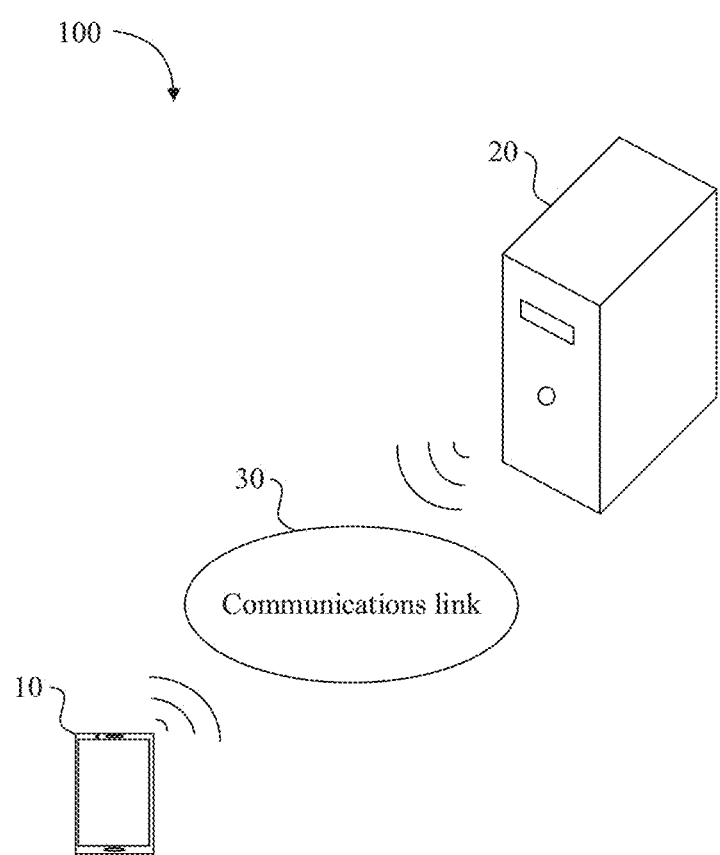
FIG. 1 is a schematic diagram of a network architecture according to an embodiment of this application.

FIG. 1 is a diagram of a network architecture according to an embodiment of this application. As shown in FIG. 1, the network architecture 100 includes a terminal 10, a digital rights management (DRM) server 20, and a communications link 30. The communications link 30 may be a wired communications link or a wireless communications link.

The terminal 10 may include but is not limited to a personal computer, a smart phone, an intelligent wearable device, a smart TV, a tablet computer, a personal digital assistant, and the like.

Figure 2:
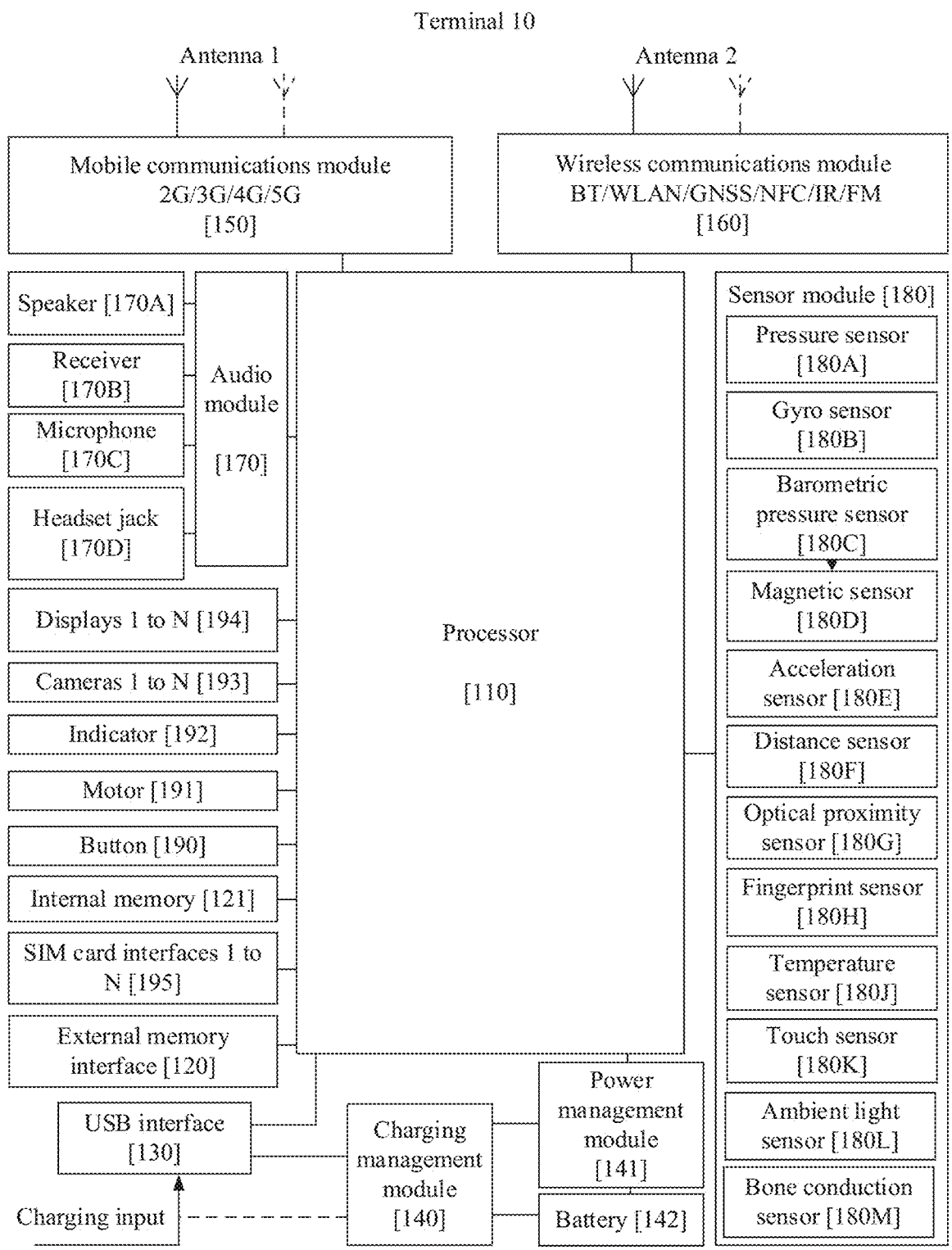
FIG. 2 is a schematic structural diagram of a terminal box according to an embodiment of this application.

FIG. 2 is a schematic structural diagram of a terminal 10.

The following uses the terminal 10 as an example to describe the embodiment in detail. It should be understood that the terminal 10 shown in FIG. 2 is only an example. The terminal 10 may include more or fewer components than those shown in FIG. 2, may combine two or more components, or may have different component configurations. Various components shown in the figure may be implemented in hardware that includes one or more signal processing and/or application-specific integrated circuits, software, or a combination of hardware and software.

The terminal 10 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display screen 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present invention constitutes no specific limitation on the terminal 10. In some other embodiments of this application, the terminal 10 may include more or fewer components than those shown in the figure, or some components may be combined, or some components may be split, or there may be a different component layout. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit. NPU), and/or the like. Different processing units may be independent devices, or may be integrated into one or more processors.

The controller may be a nerve center and a command center of the terminal 10. The controller may generate an operation control signal based on an instruction operation code and a time sequence signal, to control instruction reading and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation. PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identification module (subscriber identity module, SIM) interface, a universal serial bus (universal serial bus. USB) port, and/or the like.

The I2C interface is a two-way synchronous serial bus, including a serial data line (serial data line, SDA) and a serial clock line (derail clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K by using the I2C interface, so that the processor 110 communicates with the touch sensor 180K by using the I2C bus interface, to implement a touch function of the terminal 10.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transfer an audio signal to the wireless communications module 160 through the I2S interface, to implement a function of answering a call by using a Bluetooth headset.

The PCM interface may also be configured to: perform audio communication, and sample, quantize, and code an analog signal. In some embodiments, the audio module 170 may be coupled to the wireless communications module 160 through a PCM bus interface. In some embodiments, the audio module 170 may alternatively transfer an audio signal to the wireless communications module 160 through the PCM interface, to implement a function of answering a call by using a Bluetooth headset. Both the I2S interface and the PCM interface may be configured to perform audio communication.

The UART interface is a universal serial data bus, and is configured to perform asynchronous communication. The bus may be a two-way communications bus. The bus switches to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transfer an audio signal to the wireless communications module 160 through the UART interface, to implement a function of playing music by using a Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI interface, to implement a photographing function of the terminal 10. The processor 110 communicates with the display 194 through the DSI interface, to implement a display function of the terminal 10.

The GPIO interface may be configured by using software. The GPIO interface may be configured as a control signal or a data signal. In some embodiments, the GPIO interface may be configured to connect the processor 110 to the camera 193, the display 194, the wireless communications module 160, the audio module 170, the sensor module 180, or the like. The GPIO interface may alternatively be configured as the I2C interface, the I2S interface, the UART interface, the MIPI interface, or the like.

The USB port 130 is an interface that conforms to a USB standard specification, and may be specifically a mini USB port, a micro USB port, a USB Type C port, or the like. The USB port 130 may be configured to be connected to the charger for charging the terminal 10, or may be configured to transmit data between the terminal 10 and a peripheral device, or may be configured to connect to a headset, to play audio through the headset. This interface may be further configured to connect to another electronic device such as an AR device.

It may be understood that an interface connection relationship between the modules that is shown in this embodiment of the present invention is merely an example for description, and does not constitute a limitation on the structure of the terminal 10. In some other embodiments, the terminal 10 may alternatively use an interface connection manner different from that in the foregoing embodiment, or a combination of a plurality of interface connection manners.

The charging management module 140 is configured to receive a charging input from the charger. The charger may be a wireless charger or a wired charger. In some embodiments in which wired charging is used, the charging management module 140 may receive charging input from the wired charger through the USB port 130. In some embodiments of wireless charging, the charging management module 140 may receive a wireless charging input by using a wireless charging coil of the terminal 10. The charging management module 140 may further supply power to the electronic device through the power management module 141 when charging the battery 142.

The power management module 141 is configured to connect to the battery 142, the charging management module 140, and the processor 110. The power management module 141 receives an input of the battery 142 and/or the charging management module 140, and supplies power to the processor 110, the internal memory 121, an external memory, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the terminal 10 may be implemented by using the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the terminal 10 may be configured to cover one or more communications frequency bands. Different antennas may be further multiplexed, to improve antenna utilization. For example, the antenna 1 may be multiplexed as a diversity antenna in a wireless local region network. In some other embodiments, the antenna may be used in combination with a tuning switch.

The mobile communications module 150 can provide a solution, applied to the terminal 10, to wireless communication including 2G, 3G, 4G, 5G, and the like. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering and amplification on the received electromagnetic wave, and transmit a processed electromagnetic wave to a modem processor for demodulation. The mobile communications module 150 may further amplify a signal modulated by the modem processor, and convert the signal into an electromagnetic wave for radiation through the antenna 1. In some embodiments, at least some function modules of the mobile communications module 150 may be disposed in the processor 110. In some embodiments, at least some function modules of the mobile communications module 150 may be disposed in the same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transmits a processed signal to the application processor. The application processor outputs a sound signal by using an audio device (which is not limited to the speaker 170A, the receiver 170B, or the like), or displays an image or a video by using the display 194. In some embodiments, the modem processor may be an independent component. In some other embodiments, the modem processor may be independent of the processor 110, and is disposed in a same device as the mobile communications module 150 or another function module.

The wireless communications module 160 may provide a solution, applied to the terminal 10, to wireless communication including a wireless local area network (wireless local area networks. WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communications module 160 may be one or more components integrating at least one communications processor module. The wireless communications module 160 receives an electromagnetic wave through the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave for radiation through the antenna 2.

In some embodiments, in the terminal 10, the antenna 1 is coupled to the mobile communications module 150, and the antenna 2 is coupled to the wireless communications module 160, so that the terminal 10 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system. GPS), a global navigation satellite system (global navigation satellite system, GLONASS), a BeiDou navigation satellite system (beidou navigation satellite system, BDS), a quasi-zenith satellite system (quasi-zenith satellite system, QZSS), and/or a satellite based augmentation system (satellite based augmentation systems, SBAS).

The terminal 10 implements the display function through the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a Miniled, a MicroLed, a Micro-oLed, a quantum dot light emitting diode (quantum dot light emitting diodes, QLED), or the like. In some embodiments, the terminal 10 may include one or N displays 194, where N is a positive integer greater than 1.

The terminal 10 can implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and color temperature of a photographing scenario. In some embodiments, the ISP may be disposed in the camera 193.

The camera 193 is configured to capture a still image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into a standard image signal in an RGB format, a YUV format, or the like. In some embodiments, the terminal 10 may include one or N cameras 193, where N is a positive integer greater than 1.

The digital signal processor is configured to process a digital signal, and may further process another digital signal in addition to the digital image signal. For example, when the terminal 10 selects a frequency, the digital signal processor is configured to perform Fourier transform, and the like on frequency energy.

The video codec is configured to compress or decompress a digital video. The terminal may support one or more video codecs. In this way, the terminal 10 can play or record videos in a plurality of coding formats, for example, moving picture experts group (moving picture experts group, MPEG)1, MPEG2, MPEG3, and MPEG4.

The NPU is a neural-network (neural-network, NN) computing processor. The NPU quickly processes input information by referring to a structure of a biological neural network, for example, a transfer mode between human brain neurons, and may further continuously perform self-learning. Applications such as intelligent cognition of the terminal 10 may be implemented by using the NPU, for example, image recognition, facial recognition, speech recognition, and text understanding.

The external memory interface 120 may be configured to be connected to an external storage card such as a micro SD card, to extend a storage capability of the terminal 10. The external storage card communicates with the processor 110 through the external memory interface 120, to implement a data storage function. For example, files such as music and a video are stored in the external storage card.

The internal memory 121 may be configured to store computer-executable program code. The executable program code includes instructions. The processor 110 runs the instruction stored in the internal memory 121, to implement various function applications and data processing of the terminal 10. The internal memory 121 may include a program storage area and a data storage area. The program storage area may store an operating system, an application required by at least one function (for example, a sound playing function and an image playing function), and the like. The data storage area may store data (for example, audio data or a phone book) created during use of the terminal 10, and the like. In addition, the internal memory 121 may include a high-speed random access memory, or may include a nonvolatile memory, for example, at least one magnetic disk storage device, a flash memory, or a universal flash storage (universal flash storage, UFS).

The terminal 10 may implement audio functions such as music playing and recording through the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to code and decode an audio signal. In some embodiments, the audio module 170 may be disposed in the processor 110, or some function modules in the audio module 170 are disposed in the processor 110.

The speaker 170A, also referred to as a "loudspeaker", is configured to convert an audio electrical signal into a sound signal. The terminal 10 may listen to music by using a speaker 170A, or listen to a hands-free call.

The receiver 170B, also referred to as an "earpiece", is configured to convert an audio electrical signal into a sound signal. When a call is answered or audio information is listened to by using the terminal 10, the receiver 170B may be put close to a human ear to listen to a voice.

The microphone 170C, also referred to as a "mike" or a "mic", is configured to convert a sound signal into an electrical signal. When making a call or sending a voice message, a user may make a sound near the microphone 170C through the mouth, to enter a sound signal to the microphone 170C. At least one microphone 170C may be disposed in the terminal 10. In some other embodiments, two microphones 170C may be disposed in the terminal 10, to collect a sound signal and further implement a noise reduction function. In some other embodiments, three, four, or more microphones 170C may alternatively be disposed in the terminal 10, to collect a sound signal, reduce noise, further identify a sound source, implement a directional recording function, and the like.

The headset jack 170D is configured to connect to a wired headset. The headset jack 170D may be the USB interface 130, or may be a 3.5 mm open mobile terminal platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The terminal 10 determines intensity of pressure based on variation of the capacitance. When a touch operation is performed on the display 194, the terminal 10 detects intensity of the touch operation by using the pressure sensor 180A. The terminal 10 may also calculate a touch position based on a detection signal of the pressure sensor 180A. In some embodiments, touch operations that are performed at a same touch location but have different touch operation strength may correspond to different operation instructions. For example, when a touch operation whose touch operation strength is less than a first pressure threshold is performed on a Messages icon, an instruction for viewing an SMS message is executed. When a touch operation whose touch operation strength is greater than or equal to the first pressure threshold is performed on a Messages icon, an instruction for creating an SMS message is executed.

The gyro sensor 180B may be configured to determine a moving posture of the terminal 10. In some embodiments, angular velocities of the terminal 10 around three axes (namely, x, y, and z axes) may be determined by using the gyro sensor 180B. The gyroscope sensor 180B may be configured to perform image stabilization during photographing. For example, when the shutter is opened, the gyro sensor 180B detects an angle at which the terminal 10 jitters, calculates, based on the angle, a distance for which a lens module needs to compensate, and allows the lens to cancel the jitter of the terminal 10 through reverse motion, to implement image stabilization. The gyroscope sensor 180B may be further used in a navigation scenario and a motion-sensing gaming scenario.

The barometric pressure sensor 180C is configured to measure barometric pressure. In some embodiments, the terminal 10 calculates an altitude by using a barometric pressure value measured by the barometric pressure sensor 180C, to assist positioning and navigation.

The magnetic sensor 180D includes a Hall effect sensor. The terminal 10 may detect opening and closing of a flip leather case by using the magnetic sensor 180D. In some embodiments, when the terminal 10 is a flip mobile phone, the terminal 10 may detect opening and closure of a flip cover by using the magnetic sensor 180D. Further, a feature such as automatic unlocking upon opening of the flip cover is set based on a detected opening or closing state of the flip cover.

The acceleration sensor 180E may detect values of accelerations in various directions (usually on three axes) of the terminal 10, and detect a value and a direction of gravity when the terminal 10 is stationary. The acceleration sensor 180E may be further configured to identify a posture of the electronic device, and applied to an application such as switching between landscape mode and portrait mode or a pedometer.

The distance sensor 180F is configured to measure a distance. The terminal 10 may measure the distance by infrared light or laser. In some embodiments, in a photographing scenario, the terminal 10 may use the distance sensor 180F to measure a distance, to implement fast focusing.

The optical proximity sensor 180G may include, for example, a light-emitting diode (LED) and an optical detector such as a photodiode. The light-emitting diode may be an infrared light-emitting diode. The terminal 10 transmits infrared light outwards by using the light-emitting diode. The terminal 10 detects infrared reflected light from a nearby object by using the photodiode. When sufficient reflected light is detected, it may be determined that there is an object near the terminal 10. When insufficient reflected light is detected, the terminal 10 may determine that there is no object near the terminal 10. The terminal 10 may detect, by using the optical proximity sensor 180G, that the terminal 10 held by the user is close to an ear for a call, to automatically turn off a screen to save power. The optical proximity sensor 180G may also be configured to automatically unlock and lock a screen in a flip cover mode and a pocket mode.

The ambient light sensor 180L is configured to sense ambient light brightness. The terminal 10 may adaptively adjust brightness of the display 194 based on the sensed ambient light brightness. The ambient light sensor 180L may also be configured to automatically adjust a white balance during photographing. The ambient light sensor 180L may also cooperate with the optical proximity sensor 180G to detect whether the terminal 10 is in a pocket to prevent a false touch.

The fingerprint sensor 180H is configured to collect a fingerprint. The terminal 10 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the terminal 10 executes a temperature processing policy by using a temperature detected by the temperature sensor 180J. For example, when the temperature reported by the temperature sensor 180J exceeds a threshold, the terminal 10 lowers performance of a processor located near the temperature sensor 180J, to reduce power consumption to implement thermal protection. In some other embodiments, when the temperature is lower than another threshold, the terminal 10 heats the battery 142 to prevent the terminal 10 from being shut down abnormally because of a low temperature. In some other embodiments, when the temperature is lower than still another threshold, the terminal 10 boosts an output voltage of the battery 142 to avoid abnormal shutdown caused by a low temperature.

The touch sensor 180K is also referred to as a "touch panel". The touch sensor 180K may be disposed on the display 194, and the touch sensor 180K and the display 194 form a touchscreen, which is also referred to as a "touch screen". The touch sensor 180K is configured to detect a touch operation performed on or near the touch sensor. The touch sensor may transfer the detected touch operation to the application processor, to determine a type of a touch event. A visual output related to the touch operation may be provided on the display 194. In some other embodiments, the touch sensor 180K may also be disposed on a surface of the terminal 10 in a position different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse, to receive a blood pressure beating signal. In some embodiments, the bone conduction sensor 180M may alternatively be disposed in a headset to form a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The terminal 10 may receive a key input and generate a key signal input that is related to user settings and function control of the terminal 10.

The motor 191 may generate a vibration prompt. The motor 191 may be configured to provide an incoming call vibration prompt or a touch vibration feedback. For example, touch operations performed on different applications (for example, a photographing application and an audio playing application) may correspond to different vibration feedback effects. The motor 191 may also correspond to different vibration feedback effects for touch operations performed on different areas of the display 194. Different application scenarios (for example, time reminding, information receiving, an alarm clock, and a game) may also correspond to different vibration feedback effects. A touch vibration feedback effect may further be customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or plugged from the SIM card interface 195, to implement contact with or separation from the terminal 10. The terminal 10 can support one or N SIM card interfaces, where N is a positive integer greater than 1. The SIM card interface 195 can support a nano-SIM card, a micro-SIM card, a SIM card, and the like. A plurality of cards may be simultaneously inserted into a same SIM card interface 195. The plurality of cards may be of a same type or of different types. The SIM card interface 195 is compatible to different types of SIM cards. The SIM card interface 195 is also applicable to an external storage card. The terminal 10 interacts with a network by using a SIM card, to implement a call function, a data communication function, and the like. In some embodiments, the terminal 10 uses an eSIM, that is, an embedded SIM card. The eSIM card may be embedded in the terminal 10 and cannot be separated from the terminal 10.

A software system of the terminal 10 may use a layered architecture, an event driven architecture, a microkernel architecture, a microservices-based architecture, or a cloud architecture. In this embodiment of the present invention, an Android system with the layered architecture is used as an example to illustrate a software structure of the terminal 10.

Figure 3:
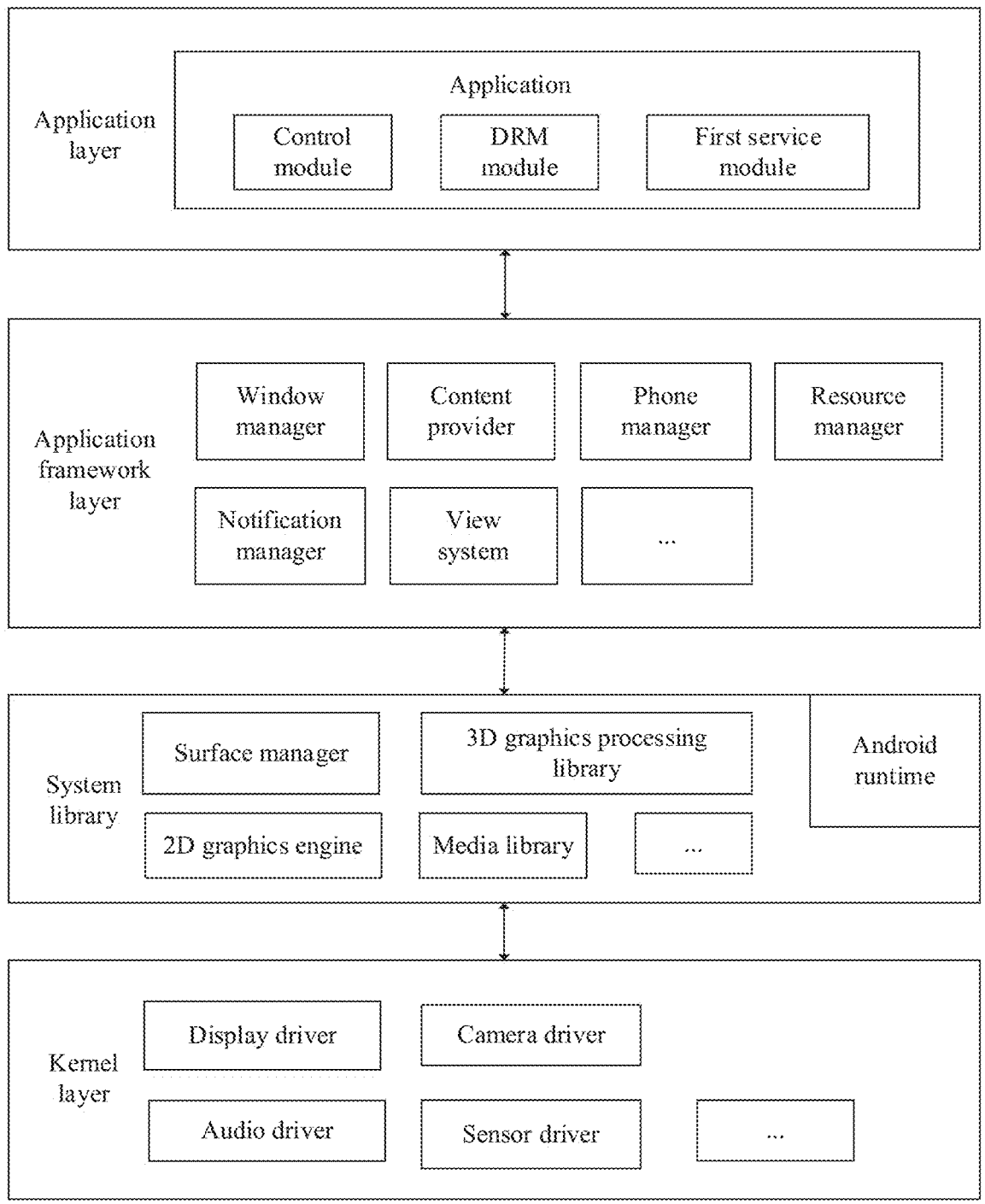
FIG. 3 is a block diagram of a software structure of a terminal according to an embodiment of this application.

FIG. 3 is a structural block diagram of software of a terminal 10 according to an embodiment of the present invention.

In the layered architecture, software is divided into several layers, and each layer has a clear role and task. The layers communicate with each other through a software interface. In some embodiments, an Android system is divided into four layers, that is, an application layer, an application framework layer, an Android runtime (Android runtime) and system library, and a kernel layer from top to bottom.

The application layer may include a series of application packages.

As shown in FIG. 3, an application program includes a control module, a DRM module, and one or more encrypted first service modules, where the first service module is configured to implement a service function of the application program, and the control module is configured to: control the DRM module to decrypt the first service module, and control running of the first service module after decryption. The control module may include, for example, an application class and initialization code invoked by the application class, such as reading a configuration item or initializing a database connection.

The application framework layer provides an application programming interface (application programming interface, API) and a programming framework for an application at the application layer. The application framework layer includes some predefined functions.

As shown in FIG. 3, the application framework layer may include a window manager, a content provider, a view system, a phone manager, a resource manager, a notification manager, and the like.

The window manager is configured to manage a window program. The window manager may obtain a size of a display screen, determine whether there is a status bar, perform screen locking, take a screenshot, and the like.

The content provider is configured to store and obtain data, and enable the data to be accessed by an application. The data may include a video, an image, audio, calls that are made and received, a browsing history and a browsing bookmark, an address book, and the like.

The view system includes a visual control, such as a control for displaying a text or a control for displaying a picture. The view system may be configured to construct an application. A display interface may include one or more views. For example, a display interface including an SMS message notification icon may include a text display view and a picture display view.

The phone manager is configured to provide a communication function of the terminal 10, for example, management of a call status (including answering, declining, or the like).

The resource manager provides an application with various resources such as a localized character string, an icon, a picture, a layout file, and a video file.

The notification manager enables an application to display notification information in the status bar, and may be used to transmit a notification-type message. The displayed information may automatically disappear after a short pause without user interaction. For example, the notification manager is configured to notify download completion, give a message notification, and the like. The notification manager may alternatively be a notification that appears in a top status bar of the system in a form of a graph or a scroll bar text, for example, a notification of an application running on the background or a notification that appears on a screen in a form of a dialog window. For example, text information is displayed in the status bar, an announcement is given, the electronic device vibrates, or an indicator light blinks.

The Android runtime includes a kernel library and a virtual machine. The Android runtime is responsible for scheduling and management of the Android system.

The kernel library includes two parts: a function that needs to be invoked in java language and a kernel library of Android.

The application layer and the application framework layer run in an Android virtual machine (DALVIK). The Android virtual machine executes Java files at the application layer and the application framework layer as binary files. The virtual machine is configured to perform functions such as object lifecycle management, stack management, thread management, security and exception management, and garbage collection.

The system library may include a plurality of function modules, for example, a surface manager (surface manager), a media library (Media Libraries), a three-dimensional graphics processing library (for example, OpenGL ES), and a 2D graphics engine (for example, SGL).

The surface manager is configured to: manage a display subsystem, and provide fusion of 2D and 3D layers for a plurality of applications.

The media library supports playback and recording in a plurality of commonly used audio and video formats, static image files, and the like. The media library may support a plurality of audio and video encoding formats, for example, MPEG4, H.264, MP3, AAC, AMR, JPG, and PNG.

The three-dimensional graphics processing library is used to implement three-dimensional graphics drawing, image rendering, compositing, layer processing, and the like.

The 2D graphics engine is a drawing engine for 2D drawing.

The kernel layer is a layer between hardware and software. The kernel layer includes at least a display driver, a camera driver, an audio driver, and a sensor driver.

Digital rights management (Digital Rights Management, DRM) refers to some technologies used by publishers to control use permission of protected objects, and is used to manage use permission of digital content (such as software, music, and movies) and digital products. A DRM protection technology can be used to control and restrict the use permission of the digital content. In the related art, a key to copyright protection of software or an application program is to prevent an unauthorized user from executing some or all of functions of a protected application program, that is, the key to copyright protection of the software or application program is to manage the use permission of the software or application program without restricting copying of the software or application program.

Figure 4:
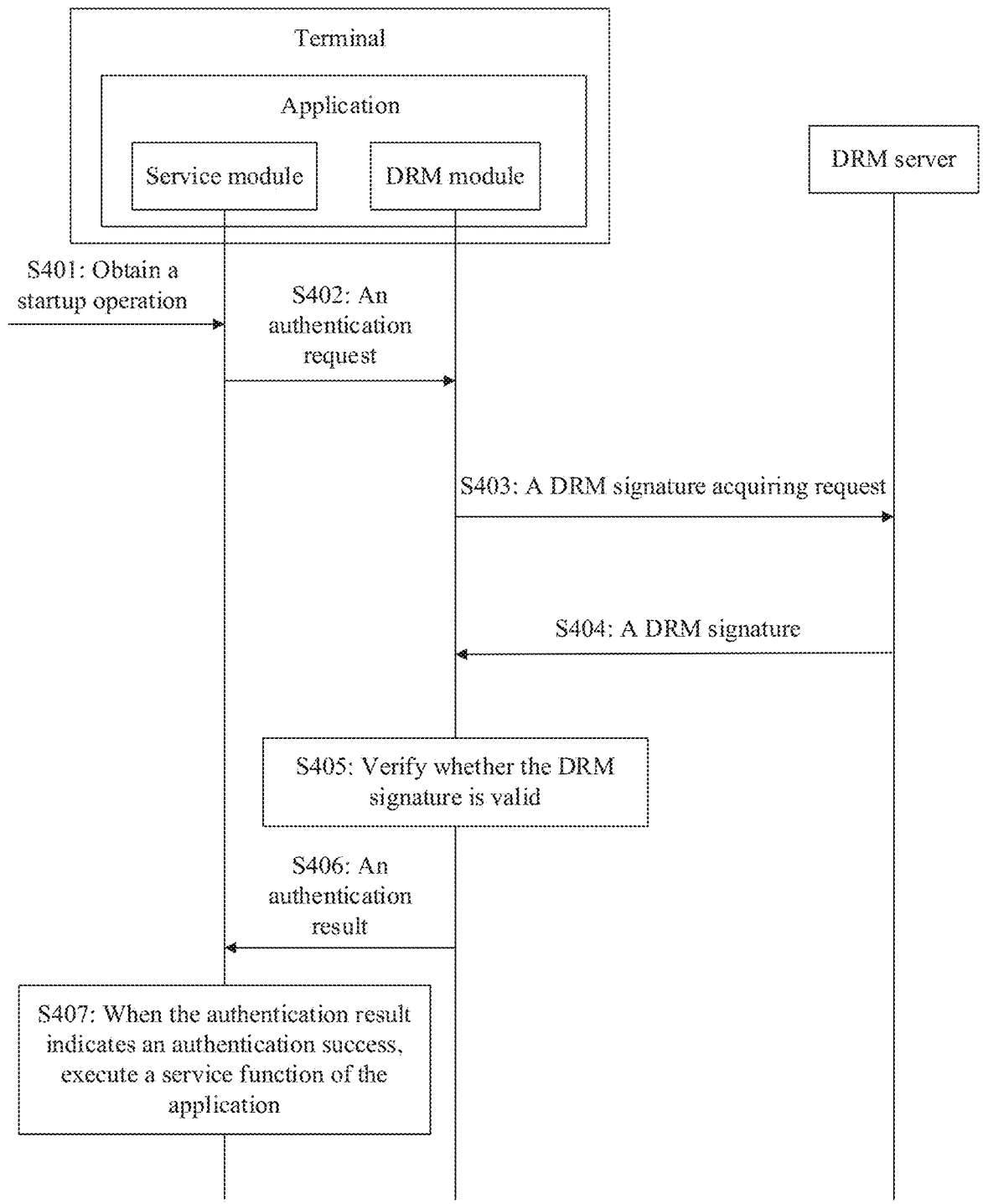
FIG. 4 is a schematic flowchart of an authentication method of an application program in the prior art.

In the prior art, to prevent an unauthorized user from using a terminal to implement a function corresponding to a protected application program by using the application program, digital rights management is usually performed on the application program in a digital signature manner. FIG. 4 is a schematic flowchart of digital rights management of an application program in the prior art. The application program includes a DRM module and a service module. The DRM module is configured to perform copyright protection on the service module by managing use permission of the service module. The service module is configured to implement a service function of the application program, for example, a service module of picture processing application software is configured to implement a picture processing function. A specific copyright protection manner is as follows:

S401: A service module of a terminal obtains a startup operation of a user for the application program.

S402: The terminal starts the application program in response to the startup operation of the user for the application program, and the service module in the application program sends an authentication request to the DRM module, where the authentication request is used to instruct the DRN module to determine whether the user has the use permission of the service module.

S403: The DRM module sends a DRM signature acquiring request to a DRM server according to the authentication request.

S404: After determining that the user has purchased the application program, the DRM server sends a DRM signature of the application program to the terminal.

S405: The DRM module verifies whether the DRM signature is valid.

S406: If the DRM signature is valid, the DRM module sends an authentication result indicating an authentication success to the service module; or if the DRM signature is invalid, the DRM module sends an authentication result indicating an authentication failure to the service module.

Step S407: When receiving the authentication result indicating the authentication success, the service module executes the service function corresponding to the application program.

It can be learned that, in the foregoing solution, the service module determines, based on the authentication result, whether to execute the service function, so that an unauthorized user can modify, into a verification result indicating a verification success by an illegal means, a verification result sent by the DRM module to the service module. In this case, even if the DRM module does not obtain the DRM signature, the service module can still run normally. The unauthorized user can use the service function of the application program at will only by modifying a verification result sent by the DRM module to the service module. As a result, the use permission of the service module of the application program fails to be protected.

Based on the foregoing problem, this application provides a method for processing an application program. The application program includes a control module, a DRM module, and one or more encrypted first service modules. The control module and the DRM module are unencrypted. The control module is configured to control running of the first service module to implement some or all service functions of the application program. For example, service functions of a picture processing application program include opening a picture, editing a picture, and saving a picture. The DRM module is configured to obtain a key of the first service module and decrypt the first service module.

In this method, when the control module of the application program obtains the first running instruction triggered by the user for running the target first service module, the control module sends the authentication request to the DRM module. The DRM module sends a key acquiring request to the DRM server according to the authentication request. The key acquiring request may include user information of the user and module information of the target first service module. After determining, based on the user information and the module information, that the user has the use permission of the target first service module, the DRM server sends key information of the target first service module to the terminal. The DRM module decrypts the target first service module after obtaining the key information, and sends an authentication response indicating an authentication success to the control module when decryption succeeds. Then, the control module executes the service function corresponding to the target first service module. In this way, because the first service module that needs to be protected is encrypted, even if an unauthorized user enables, by modifying application code, the DRM module to send the authentication result indicating the authentication success to the control module, the first service module cannot be decrypted as long as the DRM module has not obtained the key information of the first service module. Therefore, only a user with permission can use the service function corresponding to the first service module, which effectively protects the use permission of the service function of the application program.

It should be noted that, in this embodiment of this application, the control module and the DRM module may be combined into one module. For example, the control module and the DRM module may be combined into a non-service module. In this case, when the non-service module obtains the first running instruction triggered by the user for running the target first service module, the terminal sends the key acquiring request to the DRM server by using the non-service module. The key acquiring request is used to request the DRM server to return the key information of the target first service module when it is determined that the user has the use permission of the target first service module. The terminal obtains, by using the non-service module, the key information sent by the DRM server, decrypts the first service module based on the key information, and executes the service function corresponding to the target first service module. The following specifically describes the method for processing an application program provided in this application.

Figure 5:
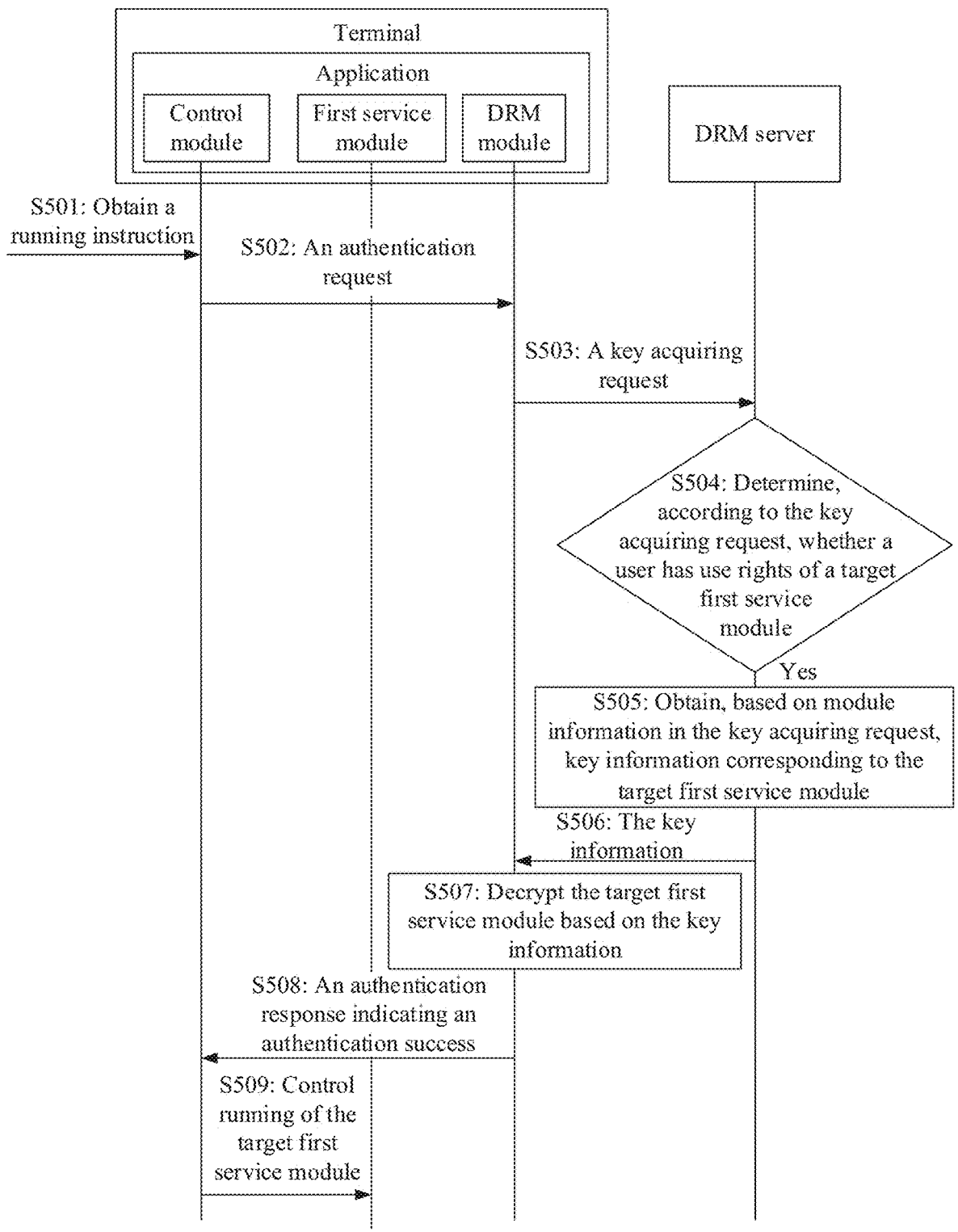
FIG. 5 is a schematic flowchart of a method for processing an application program according to an embodiment of this application.

FIG. 5 is a schematic flowchart of a method for processing an application program according to an embodiment of this application. The application program includes a control module, a DRM module, and one or more separately encrypted first service modules. The control module is configured to: control the DRM module to decrypt the first service module, and control running of the first service module after decryption, thereby implementing a service function of the first service module. The control module may include, for example, an application class and initialization code invoked by the application class, such as reading a configuration item or initializing a database connection.

When the application program includes one first service module, the first service module is configured to implement a service function of the application program. When the application program includes a plurality of first service modules, these first service modules are configured to respectively implement different service functions.

For example, a picture processing application program includes an opening service module for implementing a service function of opening a picture, an editing service module for implementing a service function of editing a picture, and a saving service module for implementing a service function of saving a picture. If the opening service module, the editing service module, and the saving service module are encrypted together, it may be considered that the picture processing application program includes one first service module. The first service module is configured to implement the service function of opening a picture, the service function of editing a picture, and the service function of saving a picture. If the opening service module, the editing service module, and the saving service module are separately encrypted, the picture processing application program includes a plurality of first service modules, namely, the opening service module, the editing service module, and the saving service module; and these first service modules are configured to separately implement different service functions of the picture processing application program.

The method includes but is not limited to the following steps.

Step 501: The control module obtains a first running instruction triggered by a user for running a target first service module.

Figure 6:
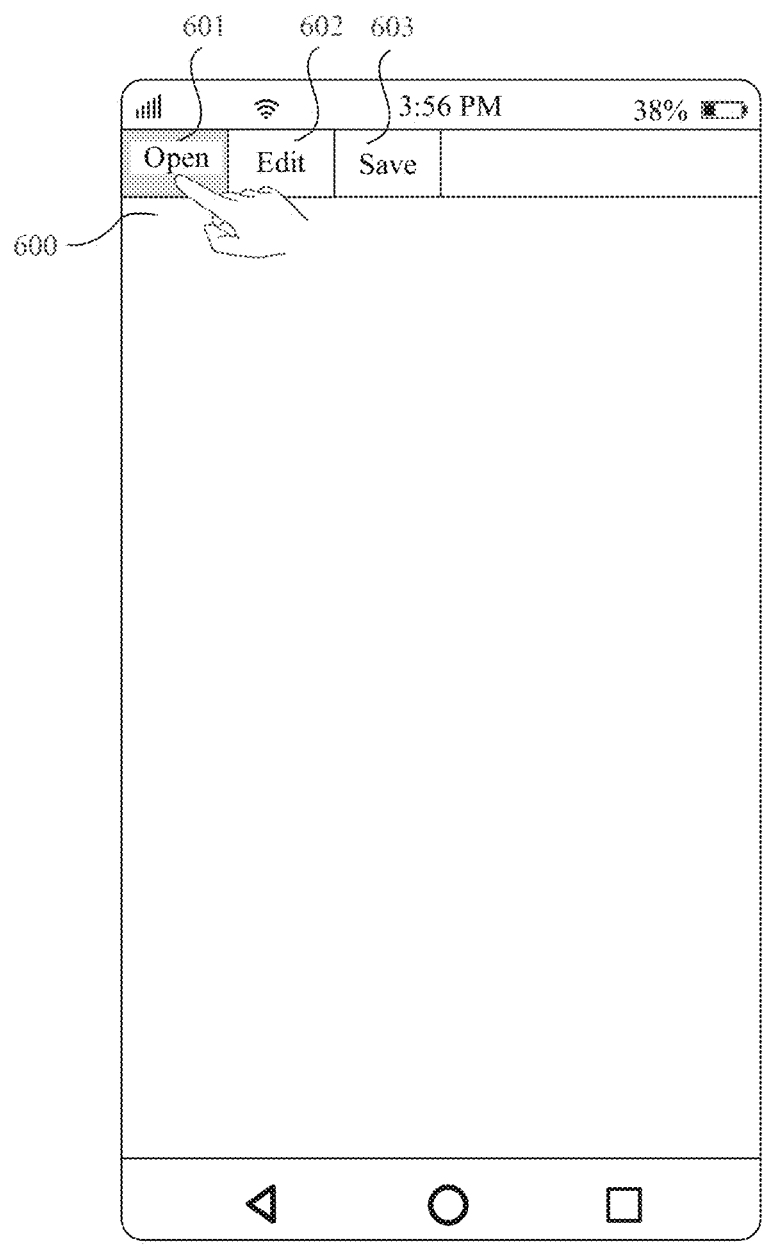
FIG. 6 is a schematic diagram of an application scenario of a method for processing an application program according to an embodiment of this application.

For example, in an example shown in FIG. 6, the application program is a picture processing application program. For example, a picture processing application program includes three separately encrypted first service modules, namely, an opening service module for implementing a service function of opening a picture, an editing service module for implementing a service function of editing a picture, and a saving service module for implementing a service function of saving a picture. A touch screen of a terminal displays an interface 600 of the picture processing application program. The interface includes an opening control 601 configured to trigger running of the opening service module, an editing control 602 configured to trigger running of the editing service module, and a saving control 603 configured to trigger running of the saving service module. If the control module obtains, by using the touch screen, a click operation that the user clicks the opening control 601 on the touch screen, it is determined that the first running instruction for running the opening service module is obtained, and that the opening service module is the target first service module. It may be understood that although the touch screen is used as an example to describe this application, this does not constitute a limitation to this application.

When the application program includes only one first service module, and the first service module is configured to implement all service functions of the application program, the control module may use, as the first running instruction, a startup instruction triggered by the user for starting the application program, and use the first service module as the target first service module.

Figure 7:
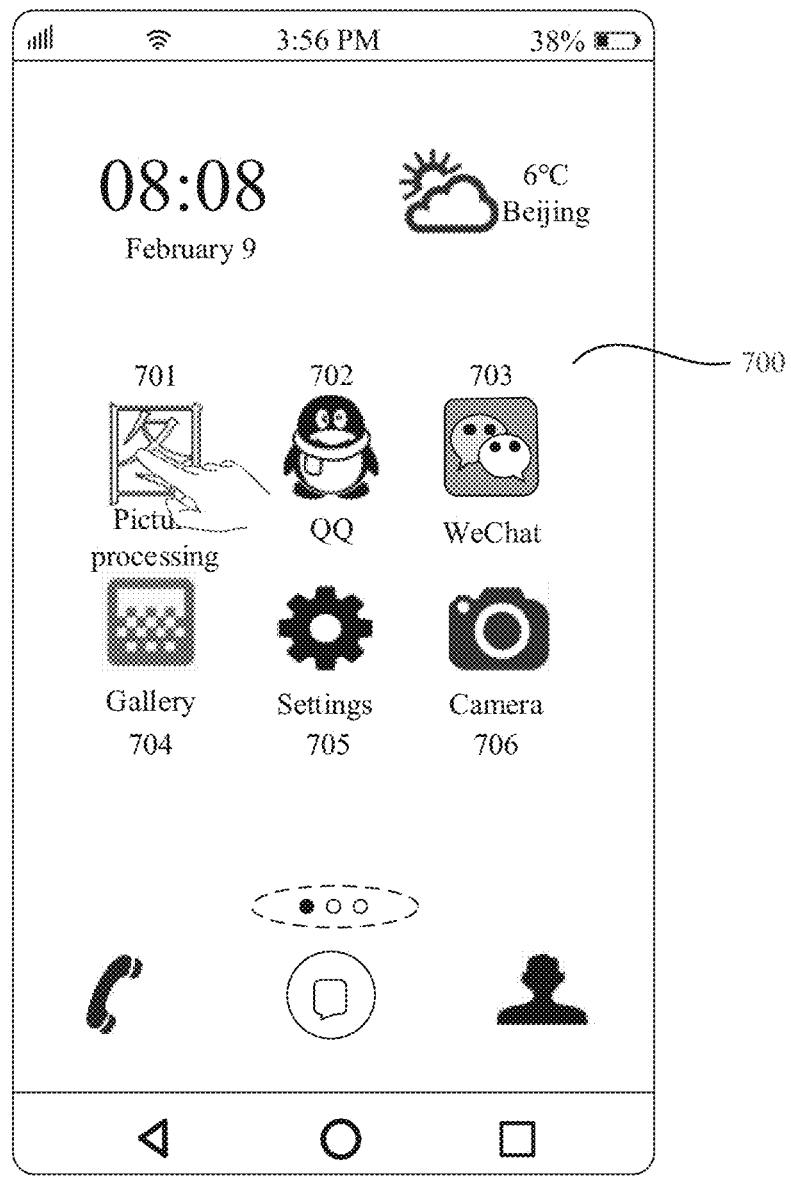
FIG. 7 is a schematic diagram of another application scenario of a method for processing an application program according to an embodiment of this application.

For example, the picture processing application program includes three functions: opening a picture, editing a picture, and saving a picture. The picture processing application program includes a control module, a DRM module, and one encrypted first service module. The first service module is configured to implement all service functions of the picture processing application program. In other words, the opening service module for implementing the service function of opening a picture, the editing service module for implementing the service function of editing a picture, and the saving service module for implementing the service function of saving a picture that are in the picture processing application program are first service modules that are encrypted together. The control module may use, as the first running instruction, the startup instruction triggered by the user for starting the picture processing application program. As shown in FIG. 7, the terminal may display a main interface 70), including a picture processing application icon 701, a first chat application icon 702, a second chat application icon 703, a gallery application icon 704, a setting application icon 705, and a camera application icon 706 of the picture processing application program. The user may trigger, by clicking the picture processing application icon 701, a startup instruction for starting the picture processing application program. After obtaining the startup instruction triggered by the user for starting the picture processing application program, an operating system of the terminal starts the application program, first runs the control module of the picture processing application program, and loads the control module to an Android virtual machine for running. The control module determines, according to the startup instruction, that the first running instruction is obtained.

Step 502: The control module sends an authentication request to the DRM module in response to the first running instruction.

The control module sends the authentication request to the DRM module according to the running instruction. The authentication request is used to request the DRM module to authenticate whether the user has use permission of the target first service module. The authentication request includes module information corresponding to the target first service module. The module information may be, for example, a service module identifier of the target first service module. The service module identifier is a unique identifier that can represent the target first service module.

The control module can invoke a com.huawei.DrmSDK-.decryptPackage method in an attachBaseContext method of an application class. In this way, the control module can invoke the DRM module and send the authentication request to the control module.

Step 503: The DRM module sends a key acquiring request to the DRM server according to the authentication request.

The key acquiring request includes user information of the user and the module information. The user information may include user identification information that can represent an identity of the user. In this way, the DRM server may find, based on the user information, application program permission information of the user. The user identification information may be unique identification information used to represent the identity of the user. For example, the unique identification information may be but is not limited to card identification information of a user identity card (SIM card) of the terminal, a user account used when the user downloads the application program from an application download platform, an email account of the user, a payment ID of a payment platform of the user, a bank card number, an identity card number, and the like.

Before sending the key acquiring request to the DRM server according to the authentication request, the DRM module may display a user information input box on the display screen of the terminal by invoking a standard function interface that is provided by the operating system and that is used to display the input box. The user can input the user identification information in the user information input box by operating the terminal.

Figure 8:
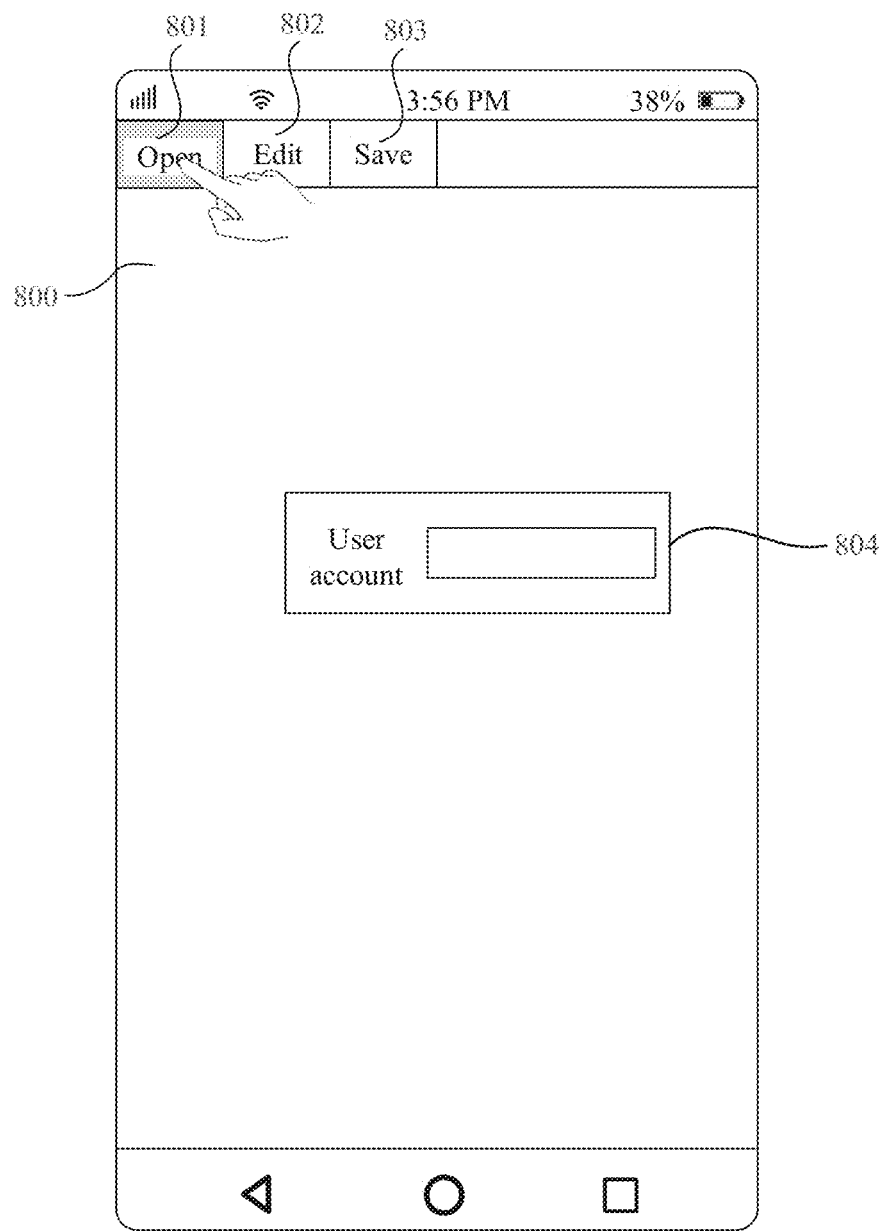
FIG. 8 is a schematic diagram of still another application scenario of a method for processing an application program according to an embodiment of this application.

For example, in an example shown in FIG. 8, the picture processing application program includes a plurality of separately encrypted first service modules, namely, an opening service module, an editing service module, and a saving service module. After the terminal enables the picture processing application program, the touch screen of the terminal displays an interface 800. The interface 800 includes an opening control 801 configured to trigger running of the opening service module, an editing control 802 configured to trigger running of the editing service module, and a saving control 803 configured to trigger running of the saving service module. When the user needs to use the picture-opening service function of the picture processing application program, the user clicks the opening control 801 on the touch screen; and the control module of the picture processing application program determines that the first running instruction for running the opening service module is obtained, and uses the opening service module as the target first service module. The control module sends the authentication request to the DRM module of the picture processing application program.

Then, the DRM module displays the user information input box 804 in the interface 800 by invoking the standard function interface that is used by the operating system to display the input box. The user may input the user identification information in the user information input box 804 by operating the terminal, where the user identification information may be, for example, the user account. The DRM module obtains, according to the standard function interface, the user identification information input by the user in the input box 804.

Certainly, in another example, the input box may also be displayed on another interface different from the foregoing interface. For example, based on the example in FIG. 7, when the picture processing application program includes only one first service module, and the first service module is configured to implement all service functions of the application program, the control module may use, as the first running instruction, a startup instruction triggered by the user for starting the application program, and use the first service module as the target first service module. After the control module sends the authentication request to the DRM module according to the first running instruction, the input box is displayed in an interface (an interface 700 in FIG. 7) displayed by the terminal when the user triggers the startup instruction for starting the application program. The foregoing interface used to display the input box is merely used as an example for description. In this application, the interface used to display the input box is not limited.

In some embodiments, after obtaining the key information corresponding to the target first service module, the DRM module may store the module information and the key information corresponding to the target first service module in the terminal for preset duration (for example, 0.5 hour, 1 hour, 2 hours, 3.5 hours, 6 hours, 24 hours, or the like.). Specifically, the DRM module may store the module information and the key information corresponding to the target first service module into a memory of the terminal. When duration for which the module information and the key information are stored in the terminal exceeds the preset duration, the DRM module deletes the module information and the key information.

After the DRM module receives the authentication request sent by the control module and before step 503, the DRM module may search the terminal for key information corresponding to module information in the authentication request. When the key information corresponding to the module information exists in the terminal, the DRM module decrypts the target first service module based on the key information, and sends an authentication response indicating an authentication success to the control module when decryption succeeds. When the key information corresponding to the module information does not exist in the terminal, the DRM module performs step 503 to send the key acquiring request to the DRM server according to the authentication request.

In this way, within the preset duration after the key information of the target first service module is obtained, when the control module obtains a running instruction for running the target first service module again, the DRM module may search the terminal for the key information of the target first service module, instead of obtaining the key information from the DRM server. Therefore, running efficiency of the application program can be improved. In addition, the DRM module deletes the key information when the duration for which the key information is stored in the terminal exceeds the preset duration. In this way, key information leakage caused by long-time storage of the key information in the terminal can be avoided. For example, after exiting the application program, the user may re-open the application program and run the target first service module in a short time. In this case, the DRM module does not need to re-obtain key information from the DMR server, so that the terminal can run the target first service module more quickly.

Step 504: The DRM server receives the key acquiring request, and determines, according to the key acquiring request, whether the user has use permission of the target first service module.

In an example, the DRM server may query, from a permission library, application program permission information corresponding to the user information, and then determine, by determining whether the application program permission information corresponding to the user information includes the module information in the key acquiring request, whether the user has the use permission of the target first service module.

Specifically, the permission library stores user information of a plurality of users and application program permission information corresponding to each piece of user information. The application program permission information corresponding to each piece of user information includes module information of a first service module whose use permission is owned by a user corresponding to the user information. The module information of the first service module may include, for example, unique identification information of the first service module, or may include application program unique identification information of an application program corresponding to the first service module and a service module keyword of the first service module. The application program permission information corresponding to each piece of user information may be determined according to a purchase record of a user corresponding to the user information. For example, if a user Y purchases an application program M and obtains use permission of a first service module K of the application program M, application program permission information corresponding to user information of the user Y in the permission library includes module information of the first service module K.

When the application program permission information corresponding to the user information includes the module information in the key acquiring request, it is determined that the user has the use permission of the target first service module; or when the module information corresponding to the user information does not include the module information in the key acquiring request, it is determined that the user does not have the use permission of the target first service module.

In another example, the DRM server may obtain user identity information of the user based on the user information, and determine, based on the user identity information, whether the user has the use permission of the target first service module. For example, the user identity information may include but is not limited to any one or more of an age, a gender, and a residential area of the user.

Specifically, the permission library stores an identity information requirement for owning use permission of a first service module of each application program. The DRM server may obtain the user identity information of the user based on the user information. For example, when the user information includes the user identity information, the DRM server may extract the user identity information from the user information; or when the user information does not include the user identity information, the DRM server may search an identity information database for the user identity information of the user based on the user information (for example, the user identification information). The DRM server may obtain, from the permission library according to the module information in the key acquiring request, an identity information requirement corresponding to the target first service module, and determine whether the user identity information meets the identity information requirement corresponding to the target first service module. If the user identity information meets the identity information requirement, the DRM server may determine that the user has the use permission of the target first service module: or if the user identity information does not meet the identity information requirement, the DRM server may determine that the user does not have the use permission of the target first service module.

In an optional embodiment, the key acquiring request may further include verification information corresponding to the user information. The verification information may include, for example, one or more of password information, biological feature information, and gesture information. The biological feature information may include but is not limited to fingerprint information, facial feature information, vein information, and iris information.

When the verification information is password information, the DRM module may display an information input box on the terminal by invoking a standard function interface that is used by the operating system for providing the input box. The DRM module acquires the user information and the verification information that are input by the user in the user information input box. The user information input by the user may be, for example, user identification information of the user.

When the verification information is biological feature information, the DRM module may collect biological feature information of the user by invoking the standard function interface that is used by the operating system for collecting a biological feature. For example, when the verification information is fingerprint information, the DRM module may collect fingerprint information of a user by invoking a standard function interface used for collecting fingerprint information.

Preferably, after obtaining the user information and the verification information corresponding to the user information, the DRM module may store the user information and the corresponding verification information in the memory of the terminal, and set a validity period. When time for which the user information and the corresponding verification information are stored in the memory of the terminal exceeds the validity period, the DRM module deletes the user information and the verification information. In this way, when the DRM module needs to obtain the user information and the corresponding verification information of the user again within the validity period, the DRM module may directly obtain the user information and the verification information from the memory of the terminal. Therefore, the user does not need to input the user information and the verification information again. In this way, a user operation can be simplified, and the terminal can run the target first service module more quickly.

After obtaining the user information and the corresponding verification information, the DRM module sends the user information and the verification information to the DRM server along with the key acquiring request. The DRM server verifies whether the verification information in the key acquiring request matches the user information. If the verification information in the key acquiring request matches the user information, the DRM server determines that the user information corresponds to a user sending the running instruction, and further determines whether the user has the use permission of the target first service module; or if the verification information in the key acquiring request does not match the user information, the DRM server does not need to determine whether the user has the use permission of the target first service module. In this way, the DRM server may verify whether the first running instruction is triggered by the user corresponding to the user information, so as to prevent an unauthorized user from obtaining user information of a first user who has the use permission of the target first service module, and obtain the key information of the target first service module from the DRM server based on the user information of the first user.

The DRM server stores a plurality of pieces of user information and prestored verification information matching each piece of user information. When determining whether the verification information in the key acquiring request matches the user information, the DRM server may first determine whether the verification information in the key acquiring request conforms with prestored verification information corresponding to the user information. If the verification information in the key acquiring request conforms with the prestored verification information, it is determined that the verification information in the key acquiring request matches the user information; or if the verification information in the key acquiring request does not conform with the prestored verification information, it is determined that the verification information in the key acquiring request does not match the user information.

For example, when the verification information is a fingerprint, the DRM server stores a plurality of pieces of user information and prestored fingerprint information matching each piece of user information. The DRM module collects fingerprint information of the user as verification information by invoking a fingerprint recognition module of the terminal by using a standard function interface of the operating system, and sends the user information and the fingerprint information to the DRM server along with the key acquiring request. The DRM server determines whether the fingerprint information in the key acquiring request conforms with prestored fingerprint information corresponding to the user information. If the fingerprint information in the key acquiring request conforms with the prestored fingerprint information, it is determined that the verification information in the key acquiring request matches the user information; or if the fingerprint information in the key acquiring request does not conform with the prestored fingerprint information, it is determined that the verification information in the key acquiring request does not match the user information.

It should be noted that the user information is not limited to only user identification information, and the verification information is not limited to password information and biological feature information. A manner of obtaining the user information and a manner of obtaining the verification information are not limited to those in the foregoing examples. The foregoing examples are merely used for explanation and description, and constitute no limitation on this application.

In an optional embodiment, the key acquiring request may further include terminal information of the terminal, the terminal information may include a unique terminal identifier used to identify the terminal, and the unique terminal identifier may be but is not limited to a physical address, a terminal serial number, or the like of the terminal.

In another optional embodiment, the key acquiring request further includes authentication information of the DRM module, and the authentication information may be preset by a developer of the application program. The DRM server may verify validity of the DRM module according to the authentication information, so as to prevent an unauthorized program from stealing the key information from the DRM server.

After determining that the user has the use permission of the target first service module, the DRM server may further determine, based on the terminal information, whether the target first service module can be run on the terminal. In this way, the DRM server may allow only the user with the use permission to run the target first service module on a terminal that meets a preset condition.

The preset condition may be but is not limited to a configuration parameter of the terminal. The configuration parameter may be, for example, a memory size or a CPU model. In this way, the target first service module may run on a terminal that meets a configuration parameter requirement, so as to guarantee a running effect of the target first service module. Certainly, in other embodiments, the preset condition may be another condition, which is not limited herein.

Step 505: When the DRM server determines that the user has the use permission of the target first service module, the DRM server obtains the key information of the target first service module.

The DRM server stores agreed encryption manners of a plurality of first service modules. The DRM server may obtain, based on the module information in the key acquiring request, an agreed encryption manner corresponding to the target first service module. For example, when the module information includes the service module identifier of the target first service module, the DRM server may obtain the agreed encryption manner of the target first service module based on the service module identifier, and then obtain the key information of the target first service module according to the agreed encryption manner. The DRM server then sends the key information to the terminal. The key information may include, for example, the agreed encryption manner or a decryption algorithm obtained according to the agreed encryption manner.

In the technical solution of this application, the developer may encrypt code of the service module of the application program by using an agreed encryption manner to obtain one or more first service modules, and then package the control module, the DRM module, and the one or more first service modules of the application program to obtain an installation package of the application program. Then, the installation package of the application program is released to an application store or another application download platform for the user to download.

For example, the picture processing application program includes an opening service module, an editing service module, and a saving service module. When a developer of the picture processing application program needs to set use permission for the opening service module, the editing service module, and the saving service module together, the developer may encrypt the opening service module, the editing service module, and the saving service module together by using the agreed encryption manner, and then package the control module, the DRM module, as well as the opening service module, the editing service module, and the saving service module that are encrypted together, to obtain the installation package of the picture processing application program. The opening service module, the editing service module, and the saving service module that are encrypted together may be understood as a first service module. When the developer of the picture processing application program needs to set use permission for the opening service module, the editing service module, and the saving service module separately, the developer may encrypt the opening service module, the editing service module, and the saving service module separately by using the agreed encryption manner, and then package the control module, the DRM module, the encrypted opening service module, the encrypted editing service module, and the encrypted saving service module, to obtain the installation package of the picture processing application program. The encrypted opening service module may be understood as one first service module, the encrypted editing service module may be understood as one first service module, and the encrypted service saving module may also be understood as one first service module. In this case, the application program includes three first service modules.

In an optional embodiment, after encrypting the code of the service module of the application program by using the agreed encryption manner to obtain one or more first service modules, the developer packages the control module, the DRM module, and the one or more first service modules of the application program, performs digital signature to obtain the installation package of the application program, and then releases the installation package of the application program to an application store or another application download platform for the user to download. Specifically, the developer may package the code of the service module into a new Android Dex file, and encrypt the Dex file by using the agreed encryption manner, where the encrypted Dex file includes one or more first service modules. Then, the developer packages the encrypted Dex file, the control module, and the DRM module, and performs signature, to obtain the installation package of the application program. The digital signature is used to mark validity of the application program. If an unauthorized user modifies and repackages a valid application program, the digital signature becomes invalid. Before running the application program, the terminal may verify, by verifying whether the digital signature in the installation package of the application program is valid, whether the application program is a valid application program.

The agreed encryption manner is an encryption manner agreed upon by the developer and the DRM server. The agreed encryption manner may be provided by the application download platform, prestored by the DRM server, or set by the developer.

When the agreed encryption manner is provided by the application download platform, the application download platform sends the agreed encryption manner to the DRM server, and provides the agreed encryption manner to the developer. In this way, the DRM server may obtain, from the application download platform, the agreed encryption manner provided by the application download platform, and the developer may also encrypt the service module of the application program by using the agreed encryption manner provided by the application download platform. For example, when the developer releases, to the application download platform, an application program whose first service module is encrypted by using an agreed encryption manner A, the application download platform may send the module information of the first service module and the agreed encryption manner A to the DRM server. The DRM server stores a correspondence between the agreed encryption manner A and the module information of the first service module into a memory of the DRN server.

When the agreed encryption manner is an encryption manner provided by the DRM server, the DRM server receives an encryption manner acquiring request sent by a development terminal, and provides the agreed encryption manner to the development terminal. The developer obtains the agreed encryption manner by using the development terminal, and encrypts a service module according to the agreed encryption manner to obtain a first service module. The DRM server may obtain module information of the first service module from the encryption manner acquiring request when receiving the encryption manner acquiring request, or may obtain, after the developer completes development of the application program, the module information of the first service module fed back by the developer by using the development terminal. After obtaining the module information of the first service module, the DRM service associates the module information of the first service module with the agreed encryption manner, and stores the module information in the memory of the DRM server.

When the agreed encryption manner is provided by the developer, the developer may encrypt the service module by using the agreed encryption manner set by the developer, to obtain the first service module. The developer may send the module information of the first service module and the agreed encryption manner to the DRM server by using the development terminal. The DRM server obtains and stores the module information of the first service module and the agreed encryption manner.

In this way, the DRM server stores module information of a plurality of first service modules and an agreed encryption manner corresponding to each piece of module information. When the DRM server receives the key acquiring request that is sent by the terminal and that is used to acquire the key information of the target first service module, the DRM server determines, based on the user information and the module information in the key acquiring request, that the user corresponding to the user information has the use permission of the target first service module corresponding to the module information; then searches, based on the module information, the memory of the DRM server for the agreed encryption manner corresponding to the module information; obtains the key information of the target first service module according to the agreed encryption manner obtained by searching; and sends the key information to the terminal.

The agreed encryption manner may be but is not limited to an RSA algorithm, an advanced encryption standard (AES), or an elliptic curve digital signature algorithm (ECDSA). It should be noted that, the foregoing setting solution example of the agreed encryption manner is merely used for explanation and description, and constitutes no limitation on this application. In other embodiments, the agreed encryption manner may be obtained by using other agreed manners.

When the application program includes a plurality of first service modules, encryption manners of the first service modules may be the same or different.

In an optional embodiment, in a plurality of first service modules, encryption manners of at least two different first service modules are the same. In this case, a developer can encrypt, by using the same encryption manner, service modules that need to be encrypted, so that a quantity of times of agreeing on an encryption manner can be decreased.

It should be noted that, when encryption manners of different first service modules are the same, the DRM module also decrypts, by only using the obtained key information, the target first service module corresponding to the first running instruction. For example, encryption manners of a first service module P and a first service module Q are the same, and key information obtained by the DRM according to the first running instruction for running the first service module P is used for only decrypting the first service module P, but not decrypting the first service module Q. In this way, although encryption manners of different first service modules are the same, the DRM module may still separately manage the use permission of each first service module.

In another optional embodiment, encryption manners of different first service modules are different. In this way, after intercepting key information corresponding to one first service module, an unauthorized program can be prevented from decrypting other first service modules by using the key information, so that use permission of each first service module of the application program can be managed more effectively.

Step 506: The DRM server sends the key information to the terminal.

Step 507: The DRM module receives the key information sent by the DRM server, and decrypts the service module based on the key information.

When the key information includes the agreed encryption manner, the DRM module may obtain a decryption algorithm according to the agreed encryption manner, and decrypt the target first service module by using the decryption algorithm, to obtain a decrypted service module. When the key information includes the decryption algorithm obtained according to the agreed encryption manner, the DRM module may decrypt the target first service module by using the decryption algorithm in the key information, to obtain a decrypted target first service module. Specifically, the DRM module may read, from the application program, the Dex file that includes execution code of the target first service module, and decrypt the Dex file by using the key information, to obtain a decrypted Dex file.

Step 508: When decryption succeeds, the DRM module sends an authentication response indicating an authentication success to the control module.

Specifically, after starting the application program, the terminal first runs the control module, and loads the control module to the Android virtual machine for running. When decryption succeeds, the DRM module may load the decrypted Dex file to the Android virtual machine, so that the control module can control, in the Android virtual machine, service code for executing the Dex file.

Step 509: When receiving the authentication response indicating the authentication success, the control module controls running of the decrypted target first service module, to implement a service function corresponding to the target first service module.

Figure 9:
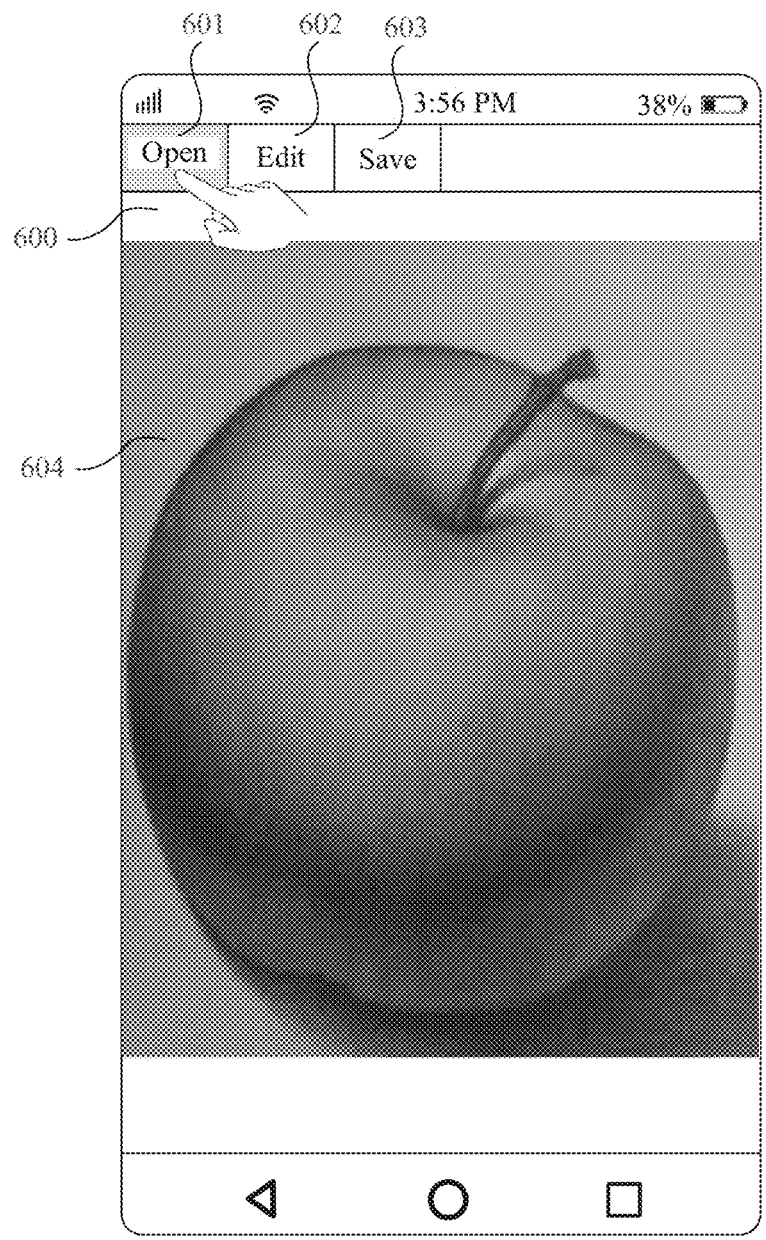
FIG. 9 is a schematic diagram of yet another application scenario of a method for processing an application program according to an embodiment of this application.

For example, based on the foregoing embodiment in FIG. 6, the DRM module obtains key information of the opening service module from the DRM server according to the authentication request sent by the control module, and decrypts the opening service module by using the key information, to obtain a decrypted opening service module. Then, the DRM module sends an authentication response indicating an authentication success to the control module. After receiving the authentication response, the control module controls running of the opening service module. In this way, the user can open a picture through the picture processing application program, for example, open a picture 604 shown in FIG. 9.

For another example, based on the foregoing embodiment in FIG. 7, the opening service module for implementing the service function of opening a picture, the editing service module for implementing the service function of editing a picture, and the saving service module for implementing the service function of saving a picture that are in the picture processing application program are first service modules that are encrypted together. The DRM module obtains key information of the first service module from the DRM server according to the authentication request sent by the control module, and decrypts the opening service module, the editing service module, and the saving service module by using the key information, to obtain a decrypted first service module. Then, the DRM module sends an authentication response indicating an authentication success to the control module. After receiving the authentication response, the control module controls running of the first service module. In this way, the terminal can enter a main interface of the application program, to enable the user to implement, by using the picture processing application program, service functions of opening a picture, editing a picture, and saving a picture.

In this embodiment of this application, because the first service module that needs to be protected is encrypted, even if an unauthorized user enables, by modifying application code, the DRM module to send the authentication response indicating the authentication success to the control module, the first service module cannot be decrypted as long as the DRM module has not obtained the key information of the first service module. As a result, the first service module cannot be run on the terminal. The terminal needs to obtain corresponding key information when running the first service module to implement a corresponding service function. A condition for obtaining the key information is that a user using the terminal needs to have use permission of the first service module. In this way, only a user who has the use permission of the first service module can use the service function of the first service module of the application program, thereby effectively protecting the use permission of the service function of the application program.

The technical solution in this embodiment of this application can be applied to an application program supporting dynamic loading. The application program supporting dynamic loading may be understood as an application program that can be loaded by a plurality of steps during running, rather than an application program that cannot be run until one-step loading is completed. For example, when the application program is an Android program, one part of the Android program may be first loaded to and run on the Android virtual machine (DALVIK), and then another part of the Android program may be loaded to and run on the Android virtual machine. With reference to this embodiment, the control module and the DRM module of the application program are first loaded to and run on the Android virtual machine. Then, after the DRM module decrypts the encrypted target first service module, the decrypted target first service module is loaded to and run on the Android virtual machine. This process of first loading and running one part of the application program and then loading and running another part of the application program is a dynamic loading process. An application program supporting this loading manner is an application program supporting dynamic loading.

It can be learned that the technical solution of this application is not limited by an operating system. In this application, use permission of a service function of an application program is protected by encrypting a service module in the application program, without depending on an operating system. This application may be applied to but is not limited to an Android system, a Windows system, a Linux system, or another system that can support dynamically loaded application programs.

It should be noted that, in the foregoing embodiment, the control module and the DRM module may be combined into one module. For example, the control module and the DRM module may be combined into a non-service module. In other words, steps 501 to 503 may be implemented by the non-service module. When the non-service module obtains an instruction that is triggered by the user for running the target first service module, the non-service module sends the key acquiring request to the DRM server. Steps 507 to 509 may also be implemented by the non-service module. The non-service module receives the key information sent by the DRM server, decrypts the target first service module based on the key information, and when decryption succeeds, controls running of the decrypted target first service module, to implement a service function corresponding to the target first service module.

In a further embodiment, the terminal includes a trusted execution environment (trusted execution environment, TEE) and a rich execution environment (rich execution environment, REE). The TEE provides a secure execution environment for a trusted application (trusted application, TA), and also protects confidentiality, integrity, and access rights of resources and data of the TA. An operating system of a terminal, for example, an Android system or a Windows system, runs in the rich execution environment REE.

After obtaining the running instruction, the control module loads the DRM module to the TEE, and then sends an authentication request to the DRM module. In this way, the DRM module sends, in the TEE, the key acquiring request to the DRM server according to the authentication request, and receives the key information sent by the DRM server, so that security of the key information can be improved, and the key information can be prevented from being obtained by an unauthorized program. In this way, the TEE can ensure confidentiality, integrity, and access rights of resources and data of the DRM module, thereby improving security of use permission management for the application program.

In some embodiments, when obtaining the running instruction triggered by the user for running the target first service module, the control module displays a preset image on a display screen of the terminal, and sends the authentication request to the DRM module. When receiving the authentication response that is sent by the DRN module and that indicates the authentication success, the control module stops displaying the preset image on the terminal, and controls running of the target first service module, to implement the service function corresponding to the service module. In this way, the terminal displays the preset image in a process in which the DRM module sends the key acquiring request for requesting the DRM server to deliver the key information, so that the following phenomenon can be avoided: The terminal cannot immediately run the target first service module because the key information needs to be obtained, and the user mistakenly considers that the application program is stalled.

Based on the foregoing embodiment, in an optional embodiment, the application program further includes an unencrypted second service module. One or more encrypted first service modules are configured to implement some service functions of the application program, and unencrypted service modules are configured to implement some other service functions of the application program. When obtaining the running instruction triggered by the user for running the second service module, the control module controls running of the second service module, to implement a service function corresponding to the second service module. In this way, the developer of the application program can set use permission of some service functions in a partial encryption manner.

For example, a picture processing application program includes an opening service module for implementing a service function of opening a picture, an editing service module for implementing a service function of editing a picture, a saving service module for implementing a service function of saving a picture, and a splicing service module for implementing a service function of splicing a picture. The opening service module, the editing service module, and the saving service module are encrypted, and the splicing service module is unencrypted. The opening service module, the editing service module, and the saving service module may be understood as first service modules, and the splicing service module may be understood as a second service module.

Figure 10:
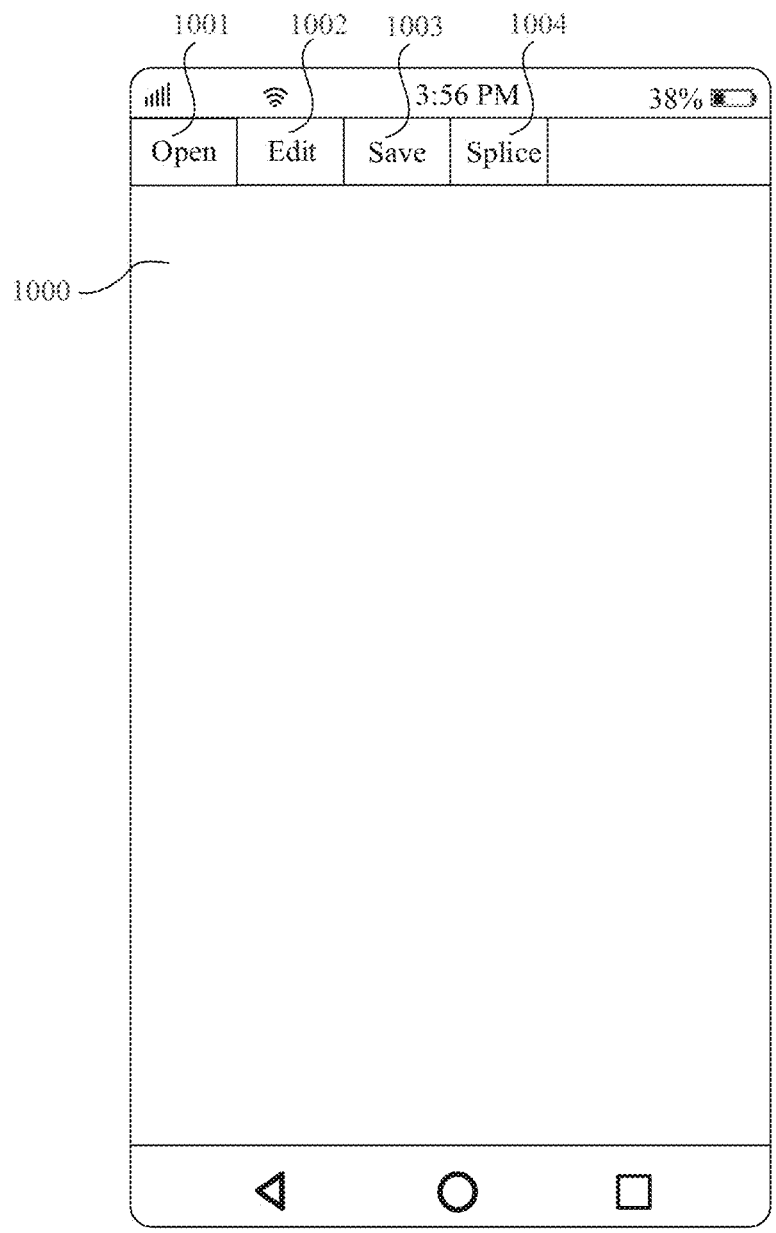
FIG. 10 is a schematic diagram of still yet another application scenario of a method for processing an application program according to an embodiment of this application.

As shown in FIG. 10, after running the picture processing application program, the terminal displays an interface 1000. The interface 1000 includes an opening control 1001 corresponding to the opening service module, an editing control 1002 corresponding to the editing service module, a saving control 1003 corresponding to the saving service module, and a splicing control 1004 corresponding to the splicing service module.

When the user clicks any one of the opening control 1001, the editing control 1002, or the saving control 1003 on the touch screen of the terminal, the first running instruction is triggered, and the control module can determine, based on the clicking operation, that the first running instruction is obtained. When the user clicks the splicing control 1004 on the touch screen of the terminal, the second running instruction is triggered, and the control module can determine, based on the clicking operation, that the second running instruction is obtained.

An embodiment of this application provides a computer storage medium, including a computer instruction. When the computer instruction runs on a terminal, the terminal is enabled to perform the method for processing an application program in any one of the foregoing possible embodiments.

An embodiment of this application provides a computer program product. When the computer program product runs on a terminal, the terminal is enabled to perform the method for processing an application program in any one of the foregoing possible embodiments.

The foregoing embodiments are merely intended to describe the technical solutions of this application, but are not to limit this application. Although this application is described in detail with reference to the foregoing embodiments, persons of ordinary skill in the art should understand that they may still make modifications to the technical solutions recorded in the foregoing embodiments or make equivalent replacements to some technical features thereof without departing from the scope of the technical solutions of the embodiments of this application.

What is claimed is:

1. A method for processing an application program, wherein the method comprises:
    obtaining, by an unencrypted control system of the application program, an unencrypted running instruction for running a target first service system of the application program;
    sending, to a digital rights management (DRM) server and using the unencrypted control system, an unencrypted key acquiring request, wherein the key acquiring request requests key information corresponding to the target first service system, wherein the key information comprises a decryption algorithm, and wherein a user permission is verified and the key information is fed back by the DRM server when the user has use permission of the target first service system;
    obtaining, from the DRM server and using the unencrypted control system, the key information;
    decrypting, based on the key information and using the unencrypted control system, the target first service system; and
    executing a first service function corresponding to the target first service system.

2. The method of claim 1, wherein the key acquiring request comprises user information of the user and module information of the target first service system configured to enable the DRM server to search for application program use permission information of the user based on the user information and the module information.

3. The method of claim 2, further comprising:
    receiving, from the user, verification information corresponding to the user information; and
    further sending, to the DRM server, the key acquiring request comprising the verification information configured to enable the DRM server to verify, before searching for the application program permission information, that the user information matches the verification information.

4. The method of claim 1, wherein sending the key acquiring request is performed in response to a lack of the key information.

5. The method of claim 1 further comprising:
    obtaining, by the unencrypted control system, a second running instruction from the user for running an unencrypted second service system; and
    executing, using the unencrypted control system and based on the second running instruction, a second service function corresponding to the unencrypted second service system.

6. The method of claim 1, further comprising:
    sending, to a DRM system of the unencrypted control system, an unencrypted authentication request;
    further sending, to the DRM server according to the authentication request, and using the DRM system, the key acquiring request;
    further receiving, using the DRM system, the key information;
    further decrypting, using the DRM system, the target first service system;
    sending, to the control system, an authentication response indicating an authentication success when decryption has succeeded; and
    further executing, using the control system, the first service function when the control system receives the authentication response.

7. The method of claim 6, further comprising:
    displaying a preset image and further sending, in response to displaying the preset image, the authentication request to the DRM system using the control system; and
    when the control system receives the authentication response:
        stopping displaying the preset image; and
        further executing, in response to stopping displaying the preset image, the first service function using the control system.

8. A terminal comprising:
    a memory configured to store instructions and an application program; and
    a processor coupled to the memory, wherein, when executed by the processor, the instructions cause the terminal to:
        obtain, by an unencrypted control system of the application program, an unencrypted running instruction for running a target first service system of the application program;
        send, to a digital rights management (DRM) server and using the unencrypted control system, an unencrypted key acquiring request, wherein the key acquiring request requests key information corresponding to the target first service system, wherein the key information comprises a decryption algorithm, and wherein a user permission is verified and the key information is fed back by the DRM server when the user has use permission of the target first service system;
obtain, from the DRM server and using the unencrypted control system, the key information; and
decrypt, based on the key information and using the unencrypted control system, the target first service system; and
execute a first service function corresponding to the target first service system.

9. The terminal of claim 8, wherein the key acquiring request comprises user information of the user and module information of the target first service system to enable the DRM server to search for application program use permission information of the user based on the user information and the module information.

10. The terminal of claim 9, wherein, when executed by the processor, the instructions further cause the terminal to:
receive, from the user, verification information corresponding to the user information; and
further send, to the DRM server, the key acquiring request comprising the verification information to enable the DRM server to verify, before searching for the application program permission information, that the user information matches the verification information.

11. The terminal of claim 8, wherein sending the key acquiring request is performed in response to the terminal lacking the key information.

12. The terminal of claim 8, wherein, when executed by the processor, the instructions further cause the terminal to execute, using the unencrypted control system, a second service function corresponding to an unencrypted second service system in response to a second running instruction from the user for running an unencrypted second service system.

13. The terminal of claim 8, wherein, when executed by the processor, the instructions further cause the terminal to:
send, to a DRM system of the unencrypted control system and using a control system of the unencrypted control system, an authentication request;
further send, to the DRM server according to the authentication request, and using the DRM system, the key acquiring request;
further receive, using the DRM system, the key information;
further decrypt, using the DRM system, the target first service system;
send, to the control system, an authentication response indicating an authentication success when decryption has succeeded; and
further execute, using the control system, the first service function when the control system receives the authentication response.

14. The terminal of claim 13, wherein, when executed by the processor, the instructions further cause the terminal to:
display a preset image and further sending, in response to displaying the preset image, the authentication request to the DRM system using the control system; and
when the control system receives the authentication response:
stop displaying the preset image; and
further execute, in response to stopping displaying the preset image, the first service function using the control system.

15. A computer program product comprising computer-executable instructions that are stored on a non-transitory computer-readable medium and that, when executed by a processor, cause terminal to:
obtain, by an unencrypted control system of the application program, an unencrypted running instruction for running a target first service system of the application program;
send, to a digital rights management (DRM) server and using the unencrypted control system, an unencrypted key acquiring request, wherein the key acquiring request requests key information corresponding to the target first service system, wherein the key information comprises a decryption algorithm, and wherein a user permission is verified and the key information is fed back by the DRM server when the user has use permission of the target first service system;
obtain, from the DRM server and using the unencrypted control system, the key information;
decrypt, based on the key information and using the unencrypted control system, the target first service system; and
execute a first service function corresponding to the target first service system.

16. The computer program product of claim 15, wherein the computer-executable instructions further cause the terminal to:
send, to a DRM system of the unencrypted control system and using a control system of the unencrypted control system, an authentication request;
further send, to the DRM server according to the authentication request, and using the DRM system, the key acquiring request;
further receive, using the DRM system, the key information;
further decrypt, using the DRM system, the target first service system;
send, to the control system, an authentication response indicating an authentication success when decryption has succeeded; and
further execute, using the control system, the first service function when the control system receives the authentication response.

17. The computer program product of claim 15, wherein the key acquiring request comprises user information of the user and module information of the target first service system configured to enable the DRM server to search for application program use permission information of the user based on the user information and the module information.

18. The computer program product of claim 17, wherein the computer-executable instructions further cause the terminal to:
receive, from the user, verification information corresponding to the user information; and
further send, to the DRM server, the key acquiring request comprising the verification information configured to enable the DRM server to verify, before searching for the application program permission information, that the user information matches the verification information.

19. The computer program product of claim 15, wherein sending the key acquiring request is performed in response to the terminal lacking the key information.

20. The computer program product of claim 15, wherein the computer-executable instructions further cause the terminal to execute, using the unencrypted control system, a second service function corresponding to an unencrypted second service system in response to a second running instruction from the user for running an unencrypted second service system.

\* \* \* \* \*